(No Model.)

R. S. TICE.
COMPRESSED AIR MOTOR.

No. 254,072. Patented Feb. 21, 1882.

WITNESSES:
A. P. Grant
L. Douville

INVENTOR:
R. Stockton Tice
BY John A. Wiedersheim
ATTORNEY.

UNITED STATES PATENT OFFICE.

R. STOCKTON TICE, OF CAMDEN, NEW JERSEY, ASSIGNOR OF ONE-HALF TO GIDEON RICHMAN, OF SAME PLACE.

COMPRESSED-AIR MOTOR.

SPECIFICATION forming part of Letters Patent No. 254,072, dated February 21, 1882.

Application filed November 22, 1881. (No model.)

*To all whom it may concern:*

Be it known that I, R. STOCKTON TICE, a citizen of the United States, residing in the city and county of Camden, State of New Jersey, have invented a new and useful Improvement in Compressed-Air Motors, which improvement is fully set forth in the following specification and accompanying drawings, in which—

Figure 1:
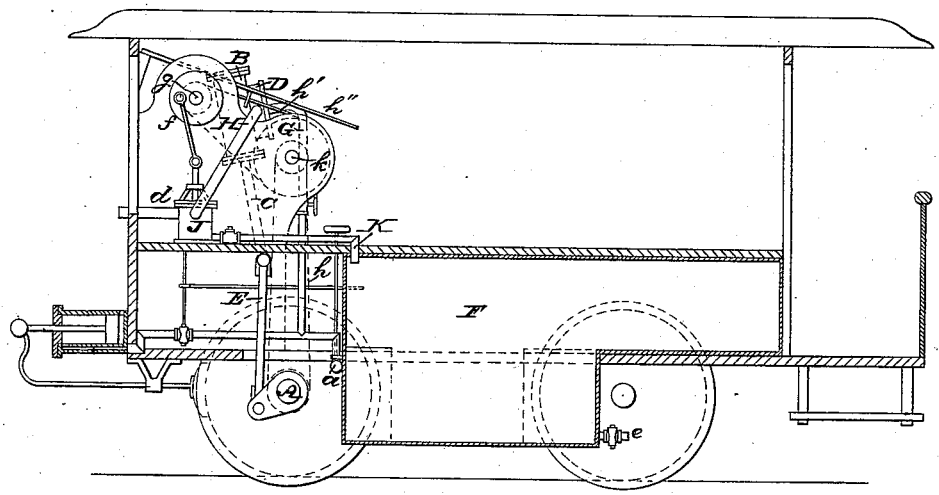
Figure 2:
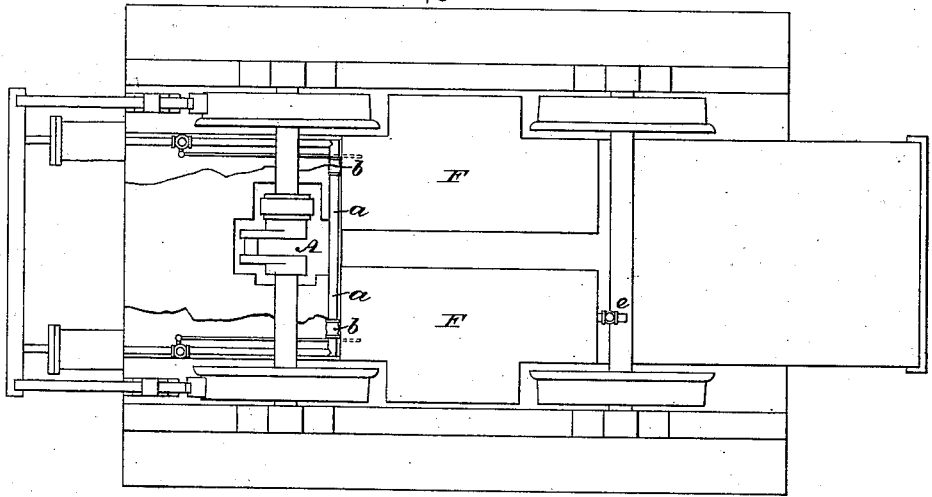
Figure 3:
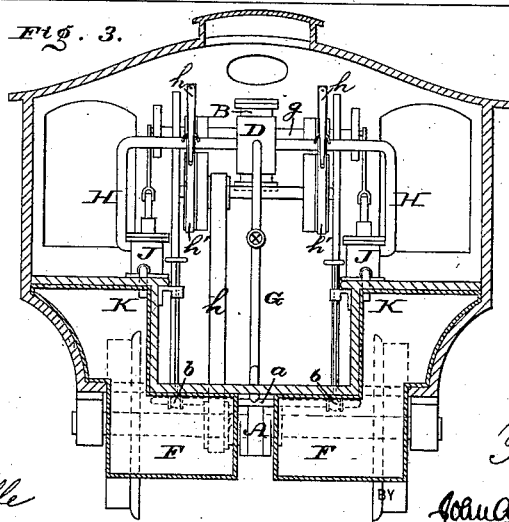

Figure 1 is a longitudinal vertical section of the motor embodying my invention. Fig. 2 is a bottom view thereof. Fig. 3 is a transverse vertical section thereof.

Similar letters of reference indicate corresponding parts in the several figures.

My invention consists of a compressed-air motor, which is easily operated, powerful, and durable, as will be hereinafter fully set forth.

Referring to the drawings, A represents a crank-shaft to which the power of the motor is communicated, said shaft in the present case forming one of the axles of a car or other vehicle, to which the description of my invention will now be limited, the invention being equally useful for other machinery and purposes, such as locomotive and stationary engines, elevators, etc.

B represents a cylinder; C, the piston-rod, and D the valve, with operative mechanism forming an engine, the frame whereof is properly mounted on the body of the car, and the piston-rod is connected to the crank axle or shaft A by means of the rod or arm E, the crank of the axle or shaft being double, if desired, in which case two cylinders and appurtenances are employed.

To the bottom of the car-body are attached two air tanks or reservoirs, F, which communicate with the chest of the valve D by means of pipes $a$ $a$ and a pipe, G, each of said pipes $a$ having a cock or valve, $b$, so that one or both of the reservoirs may be in communication with said pipe G, and consequently with the valve-chest.

H represents pipes which are connected to the chest of the valve D and communicate with the exhaust port thereof, and are also connected to the barrels of pumps J, which latter are properly mounted on the car, and communicate by means of pipes K with the air-reservoirs F, said pipes K and other pipes, when required, being provided with check-valves to prevent improper passage or return of air.

The pumps have air-inlets or supplying-pipes $d$, and one or both of the reservoirs have branches or connecting-pipes $e$, for attachment to a storage-tank containing compressed air in the depot and along the line or route.

The pump-pistons are operated by cranks $f$, which are mounted on a shaft, $g$, by which power is communicated from the crank axle or shaft A by means of belts $h$, which pass around pulleys on the shaft A and on the shaft $k$, which is mounted on the frame of the engine, and belts $h'$, which pass around pulleys on the shaft $k$ and pulleys on the shaft $g$, the latter having both loose and tight pulleys or clutch mechanism, whereby either pump may be operated, suitable shippers, $h''$, being employed for the belts $h'$, the valve of the pipe G and said shippers being located so as to be conveniently accessible by the engineer.

The operation is as follows: One of the reservoirs F is supplied with compressed air from the storage-tank, and when it is desired to start the car the valve of the pipe G and the valve of the pipe $a$ of the supplied reservoir are opened, thus admitting air to the slide-valve D and directing it against the piston C alternately in opposite ends of the cylinder B, whereby, by means of the piston and connecting-rod, the crank axle or shaft A is rotated and the car propelled. The pump which communicates with the supplied reservoir is not set in motion; but the pump of the empty reservoir is in operation, and air is forced into the empty tank, it being noticed that the pump is operated with great rapidity and power, the rapidity being greater than the movement of the piston. When the supply of air in the first-named reservoir begins to fail the valve of its pipe $a$ is closed and the valve of the pipe of the second-named reservoir opened. The first-named pump is then set in motion and the other one rendered inoperative, so that the first-named reservoir is replenished, ready to be employed when the second reservoir exhausts, the tanks F being further supplied from the storage-tanks along the line in due season, so that there is no equilibrium of pressure in the two tanks, the tanks F being provided with the branch pipes $f$, for connection with said storage-tanks, as has been stated, and by which means the engine is properly and continuously supplied with compressed air.

The exhaust-pipes H lead from the exhaust-port of the valve-chamber to the pumps, whereby hissing, puffing, or other noise of the exhaust-air is avoided and said air is directed to the reservoirs.

When the pumps are not in operation the exhaust-air admitted thereinto will be discharged through pipes leading from the barrel of the pumps outside of the car-body, said pipe having valves under control of the engineer.

The reservoirs will be provided with safety-valves, which are set to open when the pressure is excessive or dangerous.

The engine will be provided with reversing mechanism, whereby the car or machinery to which the motor is applied, may be run or operated in opposite directions.

Having thus described my invention, what I claim as new, and desire to secure by Letters Patent, is—

1. The shaft A, in combination with the piston-cylinder and connecting-rods, the valve and valve mechanism, the pumps, and the tanks F with the connecting-pipes $a$ $a$ G, substantially as and for the purpose set forth.

2. The engine, the pumps, and tanks, in combination with the exhaust-pipes H, leading from the valve of the engine to said pumps, substantially as and for the purpose set forth.

R. STOCKTON TICE.

Witnesses:
JOHN A. WIEDERSHEIM,
A. P. GRANT.